3,059,017
Patented Oct. 16, 1962

1

3,059,017
ORGANIC ESTERS OF POLYPHOSPHORUS
COMPOUNDS
James L. Dever, Arlington, Mass., and Gail H. Birum,
Dayton, Ohio, assignors to Monsanto Chemical Company, St. Louis, Mo., a corporation of Delaware
No Drawing. Filed Nov. 25, 1960, Ser. No. 71,418
17 Claims. (Cl. 260—461)

This invention relates to organic phosphorus compounds and a method of preparing them. More particularly, this invention provides new and valuable products which are prepared by reacting a trivalent phosphorus halide with an adduct of certain dicarbonylic compounds and certain esters of trivalent phosphorus acids.

In general, this invention is directed to a new class of phosphorus compounds containing a trivalent phosphorus atom, a pentavalent phosphorus atom, and a carbon to carbon double bond. These compounds are prepared according to the general equation:

$$\underset{(1)}{(3-n)\ \begin{matrix} Z'-C-O \\ \phantom{Z'-}\parallel \\ Z-C-O \end{matrix} \begin{matrix} \phantom{P}\\ \diagdown \\ \diagup \end{matrix} P \begin{matrix} \diagup \\ \diagdown \end{matrix} \begin{matrix} OR \\ Y' \end{matrix}} + \underset{(2)}{R'_nPX_{(3-n)}} \longrightarrow$$

$$R_nP-\left[\begin{matrix} Z' & Z & O & Y \\ \phantom{O}\mid & \mid & \parallel & \diagup \\ OC & = & CO & P \\ & & & \diagdown Y' \end{matrix}\right]_{3-n} + (3-n)RX$$
(3)

wherein Z is selected from the group consisting of hydrocarbyl radicals which are free from aliphatic unsaturation and have from 1 to 12 carbon atoms, Z' is selected from the group consisting of hydrocarbyl radicals which are free from aliphatic unsaturation and have from 1 to 12 carbon atoms, and hydrogen; R is selected from the group consisting of alkyl and haloalkyl radicals having from 1 to 12 carbon atoms; Y is selected from the group consisting of hydrocarbyl, hydrocarbyloxy, halohydrocarbyl, and halohydrocarbyloxy radicals which are free from aliphatic unsaturation and have from 1 to 12 carbon atoms; Y' is selected from the group consisting of Y, hydrocarbylthio, and halohydrocarbylthio radicals which are free from aliphatic unsaturation and have from 1 to 12 carbon atoms, R' is selected from the group consisting of hydrocarbyl, hydrocarbyloxy, hydrocarbylthio, halohydrocarbyl, halohydrocarbyloxy and halohydrocarbylthio radicals which are free from aliphatic unsaturation and have from 1 to 12 carbon atoms, and wherein two R' radicals taken together denote a bivalent radical selected from the group consisting of —O—alkylene—O— having from 2 to 12 carbon atoms and —O—arylene—O— having from 6 to 12 carbon atoms and completing with the phosphorus atom a ring having from 2 to 4 carbon atoms; X is selected from the group consisting of bromine and chlorine; and $n$ is a whole number of from 0 to 2. In the above equation, Formula 1 represents the adduct starting material, Formula 2 the trivalent phosphorus halide, and Formula 3 the product of this invention.

Within the definition of the above equation, the term "hydrocarbyl" radical is used to indicate in a generic way radicals such as alkyl, cycloalkyl, and aryl, alkaryl, and aralkyl radicals having from 1 to 12 carbon atoms. The term "halohydrocarbyl" is used to designate those hydrocarbyloxy radicals having chlorine, bromine, iodine, or fluorine substituents therein, but preferably chlorine or bromine, e.g., chloroalkyl. The adduct starting material is the addition product of a reaction between a trivalent phosphorus acid ester of the formula $$P\begin{matrix} \diagup OR \\ \diagdown Y \\ \phantom{\diagdown}Y' \end{matrix}$$

2 wherein R, Y and Y' are as defined above, and a dicarbonylic compound of the formula $$Z-\overset{O}{\underset{\parallel}{C}}-\overset{O}{\underset{\parallel}{C}}-Z'$$

in which Z and Z' are as defined above. The chemical structure of the resulting adducts was, until recently, not definitely known. However, it is now believed that the adduct has the cyclic structure of Formula 1 above. But whether the adduct does or does not have the indicated structure of Formula 1 is not essential to this invention. The adduct starting materials are disclosed in U.S. patent application, Serial No. 763,445, filed September 26, 1958, now U.S. Patent No. 2,961,455, issued November 22, 1960, which is incorporated herein by reference.

Dicarbonylic compounds, i.e., compounds of the formula $$Z-\overset{O}{\underset{\parallel}{C}}-\overset{O}{\underset{\parallel}{C}}-Z'$$

wherein Z and Z' are as defined above, useful for preparing the adduct starting materials includes the α-alkanediones of from 4 to 26 carbon atoms, e.g., 2,3-butanedione
2,3-pentanedione
4-methyl-2,3-pentanedione
3,4-hexanedione
2,2,5,5-tetramethyl-3,4-hexanedione
2,3-hexanedione
5-methyl-2,3-hexanedione
4,5-octanedione
2,3-octanedione
2,7-dimethyl-4,5-octanedione
3,4-heptanedione
5,6-decanedione
3,4-decanedione
5,6-dodecanedione
10,11-eicosanedione
1,2-cyclohexanedione
1,2-cyclopentanedione
13,14-hexacosanedione
4-methyl-2,3-decanedione
2,3-undecanedione
2-methyl-6,7-octanedione
3,4-nonanedione
2,5-dimethyl-3,4-hexanedione
2-methyl-5,6-heptanedione
11,12-tetracosanedione.

Another valuable class of dicarbonylic compounds which, according to the invention, form 1:1 adducts with the presently disclosed trivalent phosphorus compounds are the aryl- or cycloalkyl-substituted α-alkanedione, e.g., 1-phenyl-1,2-pentanedione
3,3-dimethyl-1-phenyl-1,2-butanedione
1-phenyl-1,2-propanedione
1,3,3-triphenyl-1,2-propanedione
1,3-diphenyl-1,2-butanedione
1,4-diphenyl-1,2-butanedione
3-methyl-1-phenyl-1,2-butanedione
1-phenyl-1,2-butanedione
1,4-diphenyl-2,3-butanedione
3,3-dimethyl-(2,4-xylyl)-1,2-butanedione
1-mesityl-3,3-dimethyl-1,2-butanedione
6-cyclopentyl-3,4-hexanedione
3-cyclohexyl-1-phenyl-1,2-propanedione
1-(β-naphthyl)-8,9-hexadecanedione Still another class of presently useful α-dicarbonylic compounds include benzil and the binaphthoyls and their hydrocarbon derivatives, e.g., o-, m-, or p-tolil; 2,2',4,4'-5,5'-hexaethylbenzil; 4,4',5,5'-tetramethylbinaphthoyl, etc.

As hereinbefore disclosed, the dicarbonylic compound may also be an α-ketoaldehyde, i.e., a glyoxal derivative of the formula

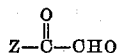

wherein Z is as defined above. Examples of α,β-ketoaldehydes which have the above formula and which react with the trivalent phosphorus acid esters or amides to give the present 1:1 adducts are:

Pyruvaldehyde
2-oxobutyraldehyde
3-methyl-2-oxobutyraldehyde
Phenylglyoxal
Cyclohexaneglyoxyaldehyde
p-Tolylglyoxal
Naphthaleneglyoxylaldehyde
Cyclopentaneglyoxylaldehyde To prepare the compounds of the invention, the adduct starting material must be the addition product of an α-dicarbonylic compound of the type described and exemplified above and a trivalent phosphorus ester having at least one alkoxy or haloalkoxy radical bonded to the trivalent phosphorus atom. The remaining valences of the trivalent phosphorus atom of the ester may be satisfied by the radicals defined by Y and Y' above because they do not enter the chemical reaction either with the α-dicarbonyl compound to form the adduct or the trivalent phosphorus halide compound, with which the adduct is reacted, to produce the compounds of this invention. An especially useful class of such trivalent phosphorus esters useful for preparing the adduct starting materials are the phosphite triesters having at least one alkoxy or haloalkoxy radical bonded to the trivalent phosphorus atom. Examples of such esters are: trimethyl, triethyl, tris(2-chloroethyl), triisopropyl, tris(3,4-dichlorobutyl), tris(3-chloro-2-bromopropyl), tri-n-amyl, tri-n-hexyl, tris(2-ethylhexyl), trinonyl, tridodecyl, 3-bromopropyl diethyl, dimethyl ethyl, butyl diethyl, 6-iodohexyl dipropyl, amyl dioctyl, ethyl methyl propyl, butyl 2-iodoethyl phenyl, ethyl diphenyl, 2-bromopropyl bis(4-chlorophenyl), octyl bis(p-tolyl), undecyl bis(o-ethylphenyl), heptyl dibenzyl, dimethyl pentachlorophenyl, ethyl dinaphthyl, dibutyl phenyl, di-p-tolyl 2-fluoroethyl, tricyclohexyl, 2-chloroethyl dibiphenylyl, tris(4-methylcyclohexyl), and amyl cyclopentyl phenyl phosphites.

Triesters of phosphorothious acid having at least one alkoxy or haloalkoxy radical bonded to the trivalent phosphorus atom may also be reacted with the α-dicarbonylic compound to prepare the adduct starting materials. Examples of such compounds are: diethyl S-ethyl phosphorothioite, bis(2-chloroethyl) S-hexyl phosphorothioite, butyl 2-ethylhexyl S-propyl phosphorothioite, S-naphthyl naphthyl butyl phosphorothioite, S-(p-butylphenyl) S-fluorododecyl ethyl phosphorothioite, and di-n-butyl S-cyclohexyl phosphorothioite.

Esters of phosphonous acids having at least one alkoxy or haloalkoxy radical bonded to the phosphorus atom are included within the group of esters useful for preparing adducts which may be used in this invention. Such esters are thus phosphonites, and phosphonothioites, e.g., ethyl phenyl phenylphosphonite, diethyl butylphosphonite, 2-chloroethyl 2-ethylhexyl β-naphthylphosphonite, 4-bromobutyl S-methyl p-tolylphosphonothioite, 2-ethylhexyl S-cyclohexyl dodecylphosphonothioite, propyl S-dodecyl ethylphosphonothioite, 2,3-dichlorooctyl S-(2-chloropropyl) phenylphosphonothioite, butyl 4-bromohexyl α-naphthylphosphonite, cyclopentyl S-(4-amylphenyl) ethylphosphonothioite, and 4-chlorocyclohexyl S-biphenylyl phenylphosphonothioite.

Esters of phosphinous acid, wherein the one ester radical in the compound is selected from the group consisting of alkoxy and haloalkoxy radicals having from 1 to 12 carbon atoms, likewise, form adducts with the α-dicarbonyl compounds described above. Examples of phosphinites useful for this purpose are: methyl dimethylphosphinite, 2-chlorohexyl didodecylphosphinite, butyl diphenylphosphinite, ethyl (ethyl)-naphthylphosphinite, cyclohexyl diphenylphosphinite, octyl dibiphenylylphosphinite, 2-bromopropyl dipropylphosphinite, etc.

Reaction of the above-described dicarbonyl compounds and the trivalent phosphorus esters is effected by simply mixing the two reactants at ordinary, decreased or increased temperature and allowing the resulting reaction mixture to stand until formation of the 1:1 adduct of the two components. Generally, the reaction is moderately exothermic; hence, no external heating need be customarily employed. This is particularly true when the carbonyl compound is a low molecular weight diketone and the phosphorus compound is a lower trialkyl phosphite. With such reactants, application of cooling is usually advantageous in order to obtain smooth reaction. When working with such active α-diketones and/or phosphites, optimum conditions comprise gradual addition of the diketone to the phosphite with application of external cooling and thorough stirring. Operation in an inert atmosphere, e.g., nitrogen, is advantageous. Since the adducts are somewhat susceptible to reaction with water, for good yields of product it is also advantageous to operate in the substantial absence of moisture. Usually it suffices to maintain the reaction temperature at, say, from 5° C. to 50° C. during addition of the diketone or ketoaldehyde. When all of the carbonylic compound has been added to the trivalent phosphorus compound and there is no longer any evidence of exothermic reaction, completion of the reaction may be assured by heating the reaction mixture to a temperature of from, say, 50° C. to 100° C. With the more sluggish carbonylic compounds, e.g., the high-molecular weight aliphatic diketones, it may be necessary to heat the reaction mixture moderately, say, to a temperature of about 50° C., before an exothermic reaction is initiated. Since reactivity of the various dicarbonylic compounds and of the various trivalent phosphorus esters is thus known to vary, it is recommended that in each initial run the keto compound and the phosphorus compound be mixed gradually at low temperatures and that external heating be employed only when there appears to be no spontaneous increase in temperature as a consequence of the mixing. Reaction of the carbonylic compound with the trivalent phosphorus ester takes place readily in the absence of an inert diluent or catalyst. The use of diluents may be particularly advantageous when working with the more reactive diketones or ketoaldehydes; such diluents may be, e.g., benzene, toluene, dioxane, methylene chloride, or hexane. When employing no diluent and using substantially the stoichiometric proportion of reactants, i.e., one molar equivalent of the phosphorus ester and one molar equivalent of the carbonylic compound, it consists essentially of the 1:1 adduct. When an excess of either the dicarbonylic compound or the trivalent phosphorus ester is employed, said excess can be readily recovered from the reaction product, e.g., by distillation. In order to assure complete participation of the generally less readily available dicarbonylic compound, an excess of the latter may be advantageously employed.

In preparing the compound of this invention, an adduct of the above defined type is reacted with a trivalent phosphorus compound having from 1 to 3 chlorine or bromine atoms bonded to the phosphorus atom with any remaining valences of the phosphorus atom being satisfied by radicals defined within the definition of R' above. Examples of phosphorus trihalides that may be used are phosphorus trichloride, phosphorus tribromide, and mixed phosphorus bromochlorides.

Examples of phosphorus dihalide compounds that may be used to prepare the compounds of this invention are the phosphoro- and phosphonodichloridites and dibromidites such as ethyl phosphorodibromidite, hexyl phosphorodichloridite, 10,11-dichloroundecyl phosphorodibromidite, 4-fluorobutyl phosphorodichloridite, S-amyl phosphorodichloridothioite, S-(4-bromohexyl) phosphorodibromidothioite, dodecyl phosphorodichloridite, 4-methylcyclohexyl phosphorodibromidite, 8-chlorodecyl phosphorodichloridite, S-(8-chlorododecyl) phosphorodibroidothioite, phenyl phosphorodichloridite, 2-ethylhexyl phosphorodibromidite, α-naphthyl phosphorodichloridite, biphenylyl phosphorodibromidite, butylphosphonodichloridite, 12-iododecylphosphonodibromidite, 4-bromo-2-chlorohexylphosphonodichloridite, cumylphosphonodibromidite, 4-fluorophenylphosphonodichloridite, p-tolylphosphonodibromidite, etc.

Phosphoro-, phosphono-, and phosphinomonochloridites and -monobromidites may also be used in the reaction with the adduct to prepare the compounds of this invention. Examples of phosphoromonochloridites and -monobromidites that may be used are: diethyl phosphorochloridite, diphenyl phosphorobromidite, bis(2-chloropropyl) phosphorochloridite, bis(cyclohexyl) phosphorochloridite, bis(p-tolyl) phosphorobromidite, ethyl hexyl phosphorochloridite, butyl 2-bromobutyl phosphorobromidite, 4-chlorophenyl naphthyl phosphorochloridite, biphenylyl amyl phosphorobromidite, 4-iodooctyl m-xylyl phosphorochloridite, 2-chloro-1,3,2-dioxaphospholane, 2-chloro-4,5-dibutyl-1,3,2-dioxaphosphorinane, 2-bromo-5-ethyl-5-methyl-1,3,2-dioxaphosphorinane, 2-chloro-4-methyl-1,3,2-dioxaphosphepane, 2-bromo-4,5-benzo-1,3,2-dioxaphospholane, propyl naphthyl phosphorochloridite, benzyl S-(2-chloroethyl) phosphorobromidothioite, S-(2,4,5-trichlorophenyl) ethyl phosphorochloridothioite, S-propyl S-hexyl phosphorochloridothioite, S-naphthyl S-(2-fluoroethyl) phosphorobromidodithioite, octyl S-phenyl phosphorochloridothioite, etc.

Examples of phosphonomonochloridites and -monobromidites that may be used are: ethyl phenylphosphonochloridite, butyl octylphosphonobromidite, 4-amylphenyl (2-chloropropyl)phosphonochloridite, S-naphthyl phenylphosphonochloridiothioite, (2-ethylhexyl) methylphosphonochloridite, 3-chlorobutyl 4-iodophenylphosphonobromidite, S-heptyl biphenylylphosphonochloridothioite, etc.

Examples of phosphinomonochloridites and -monobromidites that may be used are: dimethylphosphinochloridite, bis(3-methylbutyl)phosphinobromidite, dihexylphosphinochloridite, diphenylphosphinochloridite, bis(α-naphthyl)phosphinochloridite, p-tolylbutylphosphinobromidite, cyclopentylethylphosphinochloridite, etc.

It has been discovered, according to this invention, that when an adduct and a phosphorus halide of the above defined types are reacted, a reaction takes place wherein the trivalent phosphorus halide reactant gives up one chlorine or bromine atom for each adduct molecule which becomes attached thereto and the adduct gives up one alkyl or haloalkyl radical. The chlorine or bromine atoms given up by the trivalent phosphorus halide reactant and the alkyl or haloalkyl radical given up by the adduct combine to form an alkyl or haloalkyl chloride or bromide which is a by-product.

The compounds of this invention may be described as phosphinyloxyalkenyl ester derivatives of trivalent phosphorus acids. The phosphinyloxyalkenyl radicals discussed in this specification constitute that portion of the compounds of this invention represented by the formula

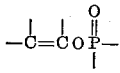

wherein the indicated free valences of the carbon, and phosphorus atoms are satisfied as described above.

When the trivalent phosphorus chloride or bromide is reacted with an adduct wherein Z and Z' are not identical radicals, i.e., where the adduct reactant is derived from an unsymmetrical diketone or an α-ketoaldehyde compound, it is possible to obtain a mixture of two isomeric products which cannot be readily separated because of the similarity in the physical properties of the isomers. For example, when the adduct starting material, derived from a diketone such as 2,3-octanedione and a phosphite ester, say, triethyl phosphite, is reacted with a phosphorus halide reactant, say, diphenyl phosphinochloridite, the product obtained is an isomeric mixture of 2-(diethoxyphosphinyloxy)-1-methylhepten-1-yl diphenylphosphinite and 2-(diethoxyphosphinyloxy)-1-pentylpropen-1-yl diphenylphosphinite. However, such an isometric mixture is not detrimental unless a pure compound is essential.

The product obtained in the reaction of this invention will depend upon the trivalent phosphorus halide that is used and upon the molar proportions of the reactants used; i.e., the number of phosphinyloxyalkenyl radicals present in the compounds of this invention depends upon the number of chlorine or bromine atoms attached to the trivalent phosphorus atom of the phosphorus halide reactant which are replaced. When only one bromine or chlorine atom thus attached is replaced, a product containing one phosphinyloxyalkenyl radical is obtained, for example, as follows:

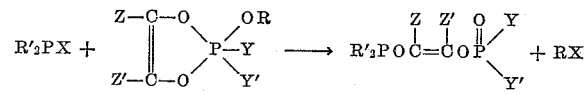

wherein R, R', X, Y, Y', Z and Z' are as defined above.

When two chlorine or bromine atoms are bonded to the trivalent phosphorus halide reactant they can both be replaced by using two moles of the adduct reactant. Thus, the reaction may be as follows:

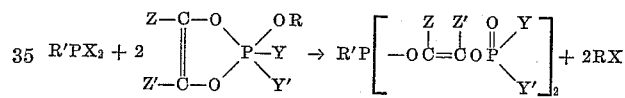

When three chlorine or bromine atoms are bonded to the trivalent phosphorus atom, i.e., when the phosphorus halide reactant is phosphorus trichloride, phosphorus tribromide or a mixture thereof, all three chlorine or bromine atoms attached to the trivalent phosphorus atom may be replaced by reaction as follows:

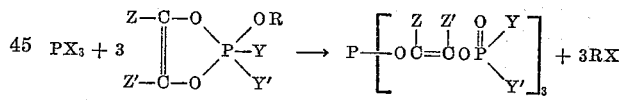

wherein the product contains three phosphinyloxyalkenyl radicals bonded to the trivalent phosphorus atom.

A few examples of phosphinyloxyalkenyl ester derivatives of trivalent phosphorus acids obtained by the method of this invention and the starting materials used to prepare them are given to illustrate the chemical principles involved in this invention:

2-[2-(butoxybutylphosphinyloxy)-1-propylpenten-1-yloxy]-4,5-benzo-1,3,2-dioxaphospholane is obtained by reacting 2-chloro-4,5-benzophospholane with a 1:1 adduct of dibutyl butylphosphonite and 4,5-octanedione;

2-(ethoxyphenoxyphosphinyloxy)-1,2-di-(p-ethylphenyl)-ethenyl S,S-bis(2-chloroethyl) phosphorodithioite by reacting S,S-bis(2-chloroethyl) phosphorochloridodithioite with a 1:1 adduct of diethyl phenyl phosphite and 4,4-diethylbenzil;

Bis{2-[bis(2-chloro-3-bromopropoxy)phosphinyloxy]-1-hexylocten-1-yl}2-chloro-3-bromopropyl phosphite obtained by reacting 2-chloro-3-bromopropyl phosphorodibromidite with 2 moles of a 1:1 adduct of tris(2-chloro-3-bromopropyl) phosphite and 7,8-tetradecanedione;

Bis[2-(dinaphthylphosphinyloxy)-1-ethylbuten-1-yl] S-dodecyl phosphorothioite obtained by reacting S-dodecyl phosphorodichloridothioite with two moles of a 1:1 adduct of ethyl dinaphthylphosphinite and 3,4-hexanedione;

Tris[2-(dipropoxyphosphinyloxy)-1,2-di-(p-tolyl)- ethenyl] phosphite obtained by reacting phosphorus trichloride with 3 moles of a 1:1 adduct of tripropyl phosphite and 4,4'-dimethylbenzil;

2 - [bis(4 - iodophenoxy)phosphinyloxy] - 1 - phenylhexen-1-yl S,S-diethyl phosphorodithioite, and its isomer 2 - [bis(4 - iodophenoxy)phosphinyloxy]-1-butyl-2-phenylethenyl S,S-diethyl phosphorochloridothioite with 1 mole of a 1:1 adduct of bis(4-iodophenyl) ethyl phosphite and 1-phenyl-1,2-hexanedione; and 2 - [(2-chloroethoxy)phenylphosphinyloxy]-1-naphthylethenyl bis(2-bromopropyl) phosphite and its isomer 2 - [(2 - chloroethoxy)phenylphosphinyloxy] - 2-naphthylethenyl bis(2-bromopropyl) phosphite, obtained by reacting bis(2-bromopropyl) phosphorochloridite with one mole of a 1:1 adduct of propyl (2-chloroethyl)phenylphosphonite and naphthaleneglyoxaldehyde.

When a trivalent phosphorus monochloride or monobromide compound is reacted with an adduct of the above defined type there is formed a mono(phosphinyloxyalkenyl) ester of the respective trivalent phosphorus acid compound. The following are a few specific examples of products obtained when the adduct used is one derived from the reaction of an alkyl, haloalkyl, cycloalkyl, or a halocycloalkyl phosphite and an α-alkanedione, and this adduct is reacted with various phosphorus monochloride or monobromide compounds:

2 - (dimethoxyphosphinyloxy) - 1 - methylpropen - 1 - yl dimethyl phosphite;

2 - [bis(2 - ethylhexyloxy)phosphinyloxy] - 1 - butylhexen-1-yl bis(2-bromoethyl) phosphite;

2 - [bis(10,11 - dichlorododecyloxy)phosphinyloxy] - 1-ethylocten-1-yl ethyl phenylphosphonite, and its isomer 2 - [bis(10,11 - dichlorododecyloxy)phosphinyloxy]-1-hexyl-2-buten-1-yl ethyl phenylphosphonite;

2 - {2 - [bis(4 - fluorobutoxy)phosphinyloxy] - 1,2 - diphenylethen - 1 - yloxy} - 5,5 - dimethyl - 1,3,2 - dioxaphosphorinane;

2 - [(4 - bromohexyloxy)ethoxyphosphinyloxy] - 1-dodecyl - tetradecen - 1 - yl S,S - dinaphthyl phosphorodithioite;

2 - [bis(4 - chlorocyclohexyloxy)phosphinyloxy] - 1-octyldecen-1-yl ethyl dodecyl phosphite; and 2 - (cyclopentyloxynonyloxyphosphinyloxy) - 1 - propylhepten-1-yl S-(4-bromobutyl) hexyl phosphorothioite, and its isomer 2-(cyclopentyloxynonyloxyphosphinyloxy)-1-pentylpenten-1-yl S - (4 - bromobutyl) hexyl phosphorothioite.

Examples of products obtained when a trivalent phosphorus monochloride or monobromide is reacted with an adduct derived from a phosphite ester having various hydrocarbylthio, and halohydrocarbylthio radicals and diketone compounds are:

2 - (ethoxyethylthiophosphinyloxy) - 1 - ethylbuten - 1-yl bis(2-chloropropyl) phosphite;

2 - [methoxy(4 - bromophenylthio)phosphinyloxy] - 1,2-bis(4-propylphenyl)ethenyl dihexyl phosphite;

2 - {2 - [(8 - iodooctyloxy)(2 - chloropropylthio)phosphinyloxy] - cyclohexen - 1 - yloxy} - 4 - methyl - 1,3,2-dioxaphospholane;

2 - [(2 - chloropropoxy)(2 - chloropropylthio)phosphinyloxy]-1,2-dinaphthylethenyl cyclohexyl phenylphosphonite;

2 - [hexyloxy(2,4 - dichlorophenoxy)phosphinyloxy]-1,2-bis(2-isobutylphenyl)ethenyl dodecyl dodecylphosphonite;

2 - [propoxy(2 - chloroethoxy)phosphinyloxy] - 1,2 - bis-(2-methylhexyl)ethenyl 2-chlorophenyl 2-chlorophenylphosphonite;

2 - [(6 - chlorohexyloxy)(6 - chlorohexylthio)phosphinyloxy] - 1,2 - bis(2,4,6 - trimethylphenyl)ethenyl diphenylphosphinite;

2 - [(2,4,5 - trichlorophenoxy)(ethyl)phosphinyloxy] - 1-hexylocten-1-yl dodecylnaphthylphosphinite; and 2 - [propoxy(2 - chlorohexylthio)phosphinyloxy] - 1-(2 - methylbutyl) - 4 - methylhexen - 1 - yl bis(4-chlorophenylphosphite.

Examples of products obtained when a trivalent phosphorus monochloride or monobromide is reacted with an adduct derived from a phosphonite ester and a diketone compound are:

2 - (ethoxyphenylphosphinyloxy) - 1 - propylpenten - 1-yl bis(2-chloroethyl) phosphite;

2 - [(2 - bromopropoxy)cyclobutylphosphinyloxy] - 1,2-bis(4-ethylphenyl)ethenyl hexyl S-hexyl phosphorothioite;

2 - {2 - [phenoxy(4 - cumyl)phosphinyloxy] - 1 - methylpropen-1-yl}-1,3,2-dioxaphosphepane;

2 - [(4 - chlorophenoxy)(p - tolyl)phosphinyloxy] - 1-butylhexen-1-yl diethyl phosphite;

2 - [4 - chloro - α - naphthyloxy)(4 - chloro-α-naphthyl)-phosphinyloxy]-1-methylpropen-1-yl ethyl ethylphosphonite;

2 - [(bromomethoxy)benzylphosphinyloxy] - 1,2 - diphenylethenyl S-phenyl phenyl phosphonite;

2 - [(2 - chloroethoxy)biphenylylphosphinyloxy] - 1-heptylnonen-1-yl 2-fluorohexyl benzylphosphonite;

2 - (pentachlorophenoxypentachlorophenylphosphinyloxy) - 1,2 - diphenylethenyl bis(pentachlorophenyl)-phosphinite;

2 - [(cyclopentyloxy)ethylphosphinyloxy] - 1,2 - dinaphthylethenyl bis(4-bromobutyl)phosphinite; and 2 - [(2 - chloro - 3 - bromobutoxy)(2 - chloro - 3 - bromobutyl) - phosphinyloxy] - 1 - ethylbuten - 1 - yl dibiphenylylphosphinite.

Examples of products obtained when a trivalent phosphorus monochloride or monobromide is reacted with an adduct of a phosphinite ester and a diketone compound are:

2 - [bis(2 - chloropropyl)phosphinyloxy] - 1 - methylpropen-1-yl bis(2-chloropropyl) phosphite;

2 - (diphenylphosphinyloxy) - 1,2 - (4 - methylphenyl)-ethenyl dodecyl phenyl phosphite;

2 - {2 - [bis(4 - chloronaphthyl)phosphinyloxy] - 1-ethylbuten - 1 - yloxy} - 5,5 - diethyl - 1,3,2 - dioxaphosphorinane;

2 - [ethyl(p - cumyl)phosphinyloxy] - 1 - butylhexen - 1-yl ethyl phenylphosphonite;

2 - (cyclohexylphenylphosphinyloxy) - 1,2 - diphenylethenyl S-(4-chlorobutyl) phenylphosphonothioite;

2 - (diethylphosphinyloxy) - 1,2 - dicyclohexylethenyl ethyl ethylphosphonite;

2 - [bis(2 - iodoethyl)phosphinyloxy] - 1 - ethylbuten - 1-yl bis(2-iodoethyl)phosphinite;

2 - [decyl(2 - chlorophenyl)phosphinyloxy] - 1,2 - diphenylethenyl diethylphosphinite; and 2 - (dihexylphosphinyloxy) - 1 - propylpenten - 1 - yl dihexylphosphinite.

When the adduct starting material is one derived from a trivalent phosphorus ester having at least one alkoxy or haloalkoxy radical bonded to the phosphorus atom and an unsymmetrical diketone compound, i.e., where Z and Z' are different radicals, reaction with a trivalent phosphorus monochloride or monobromide results in the possible formation of a mixture of two isomeric products. A few examples of such products are:

2 - [bis(2 - bromopropoxy)phosphinyloxy] - 1 - hexylbuten-1-yl bis(2-bromopropyl) phosphite, and its isomer 2 - [bis(2 - bromopropoxy)phosphinyloxy] - 1-ethylocten-1-yl bis(2-chloropropyl) phosphite;

2 - [2 - (ethoxyphenylphosphinyloxy) - 1 - phenylhexen-1 - yloxy] - 5,5 - dimethyl - 1,3,2 - dioxaphosphorinane, and its isomer 2-[2-(ethoxyphenylphinyloxy)-1-butyl- 2 - phenylethenyloxy] - 5,5 - dimethyl - 1,3,2 - dioxaphosphorinane;

2 - [bis(4 - chlorophenyl)phosphinyloxy] - 1 - (4 - ethylphenyl) - 2 - butylethenyl S,S - bis(3 - chloropropyl) phosphorodithioite, and its isomer 2-[bis(4-chlorophenyl)phosphinyloxy] - 1 - butyl-2-(4-ethylphenyl)-ethenyl S,S-bis(3-chloropropyl) phosphorodithioite.

Similarly, when the adduct starting material is one derived from a trivalent phosphorus ester having the necessary alkoxy or haloalkoxy radical bonded to the phosphorus atom and an α-ketoaldehyde, i.e., a glyoxal derivative, the resulting product with the phosphorus monochloride or monobromide reactant is a mixture of two isomeric products. A few examples of such products are:

2 - [2 - (hexyloxyhexylthiophosphinyloxy) - 1 - propylethenyloxy] - 4 - hexyl - 1,3,2 - dioxaphosphorinane and its isomer 2 - [2 - (hexyloxyhexylthiophosphinyloxy) - penten - 1 - yloxy] - 4 - hexyl - 1,3,2 - dioxaphosphorinane;

2 - [(2,2′ - dibromobiphenylyloxy)ethylphosphinyloxy]-1 - (4 - methylphenyl)ethenyl bis(2 - chloropropyl) phosphite and its isomer 2 - [(2,2′ - dibromobiphenylyloxy)ethylphosphinyloxy] - 2 - (4 - methylphenyl)-ethenyl bis(2 - chloropropyl) phosphite; and 2 - [bis(2 - iodopropyl)phosphinyloxy] - 1 - cyclopentylethenyl phenyl ethylphosphite, and its isomer 2 - [bis(2-iodopropyl)phosphinyloxy] - 2 - cyclopentylethenyl phenyl ethyl phosphite.

The same principle applies when a trivalent phosphorus dichloride or dibromide compound is reacted with an adduct of the above described general type. For example, when one mole of a trivalent phosphorus dihalide compound such as 2-chloropropyl phosphorodichloridite is reacted with two moles of a 1:1 adduct of tris(2-chloropropyl)phosphite and benzil, the reaction product obtained is bis{2 - [bis(2 - chloropropoxy)phosphinyloxy]-1,2-diphenylethenyl}2-chloropropyl phosphite,

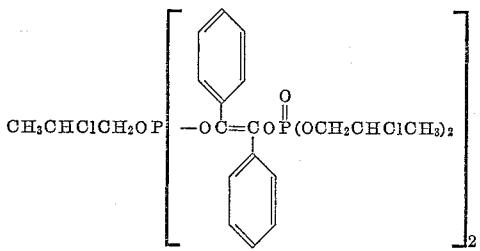

Examples of other bis(phosphinyloxyalkenyl) esters of trivalent phosphorus acid compounds are:

Bis[2 - (dihexyloxyphosphinyloxy) - 1 - methylpropen-1-yl] dodecyl phosphite;
Bis[2 - (cyclohexyloxyphenylphosphinyloxy) - 1,2 - diphenylethenyl] 4 - chloro - α - naphthyl phosphite;
Bis{2 - [bis(4 - bromophenyl)phosphinyloxy] - 1 - decyldodecen - 1 - yl} S - (2 - chloroethyl) phosphorothioite;
Bis[2 - (diethoxyphosphinyloxy) - 1,2 - bis(3 - phenylpropyl)ethenyl] butylphosphonite;
Bis[2 - (hexylthiohexylphosphinyloxy) - 1 - octyldecen-1 - yl] 2,4,5 - trichlorophenylphosphonite;
Bis{2 - [phenyl(2 - chloroethoxy)phosphinyloxy] - 1-ethylbuten - 1 - yl} p-cumylphosphonite; and
Bis{2 - [bis(2 - chloro - 3 - bromobutyl)phosphinyloxy]-1,2 - bis(4 - methylphenyl)ethenyl} 2 - chloro - 3-bromobutyl phosphonite.

When the adduct used is one derived from an α-ketoaldehyde compound or an unsymmetrical diketone, as above, the product obtained with a trivalent phosphorus dichloride or phosphorus dibromide will be an isomeric mixture of two products wherein the Z and Z′ radicals are transposed. For example, when 2-oxohexaldehyde is used with triisopropyl phosphite to prepare the adduct starting material, the product with phenyl-phosphonous dibromide is a mixture of bis[2 - (diisopropoxyphosphinyloxy) - 1 - butylethenyl] phenylphosphonite and its isomer bis[2 - diisopropoxyphosphinyloxy)hexen - 1 - yl] phenylphosphonite. When the adduct is derived from an unsymmetrical diketone compound such as 1-phenyl-1,2-hexanedione and a phosphinite ester, say, ethyl diphenylphosphinite, the product obtained with S-dodecyl phosphorodichloridothioite is an isomeric mixture of bis[2 - (diphenylphosphinyloxy) - 1 - phenylhexen - 1 - yl] S-dodecylphosphorothioite and its isomer bis[2 - (diphenylphosphinyloxy) - 1 - butyl - 2 - phenylethenyl] S - dodecyl phosphorothioite. Other examples of compounds of these types are:

Bis[2 - (dimethoxyphosphinyloxy) - 1 - octylethenyl]-propyl phosphite and its isomer bis[2 - (dimethoxyphosphinyloxy) - decen - 1 - yl] propyl phosphite;
Bis[2 - (naphthylthiophenylphosphinyloxy) - 1 - hexylethenyl] 2 - chlorobutylphosphonite and its isomer bis[2 - (naphthylthiophenylphosphinyloxy)octen - 1-yl] 2 - chlorobutylphosphonite;
Bis{2 - [bis(4 - chlorophenyl)phosphinyloxy] - 1 - naphthylethenyl} ethylphosphite and its isomer bis{2 - [bis-(4 - chlorophenyl)phosphinyloxy] - 2 - naphthylethenyl} ethylphosphite;
Bis{2 - [bis(2 - bromoethoxy)phosphinyloxy] - 1 - octyldodecen - 1 - yl} 2 - chloroethyl phosphite and its isomer bis{2 - [bis(2 - bromoethoxy)phosphinyloxy]-1 - decyldecen - 1 - yl} 2 - chloroethyl phosphite;
Bis[2 - (hexyloxyphenylphosphinyloxy) - 1 - phenylocten-1 - yl] butylphosphonite and its isomer bis[2 - (hexyloxyphenylphosphinyloxy) - 1 - hexyl - 2 - phenylethenyl] butylphosphonite; and
Bis{2 - [(2 - chloropropyl)(2 - bromoethyl)phosphinyloxy] - 1 - (2 - ethylhexyl)buten - 1 - yl} (4 - bromophenyl)phosphonite and its isomer bis{2 - [(2 - chloropropyl)(2 - bromoethyl)phosphinyloxy] - 1 - ethyl-4 - ethylocten - 1 - yl} 4 - bromophenylphosphonite.

When a trivalent phosphorus trihalide such as phosphorus trichloride or phosphorus tribromide is reacted with three moles of the adduct starting material, tris-(phosphinyloxyalkenyl) phosphite esters are obtained. An example of a compound of this type is tris{2 - [bis(2-chloroethoxy)phosphinyloxy] - 1 - methylpropen - 1 - yl} phosphite.

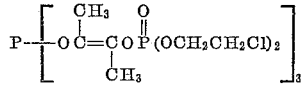

Other examples of compounds of this type are:

Tris[2 - (dihexyloxyphosphinyloxy) - 1 - butylhexen - 1-yl] phosphite;
Tris{2 - [(2 - phenylethoxy)phenylphosphinyloxy] - 1,2-diphenylethenyl} phosphite;
Tris{2 - [butyl(phenylthio)phosphinyloxy] - 1 - hexylocten - 1 - yl} phosphite;
Tris{2 - [(2 - chloropropoxy)(2 - bromopropyl)phosphinyloxy] - 1 - methylpropen - 1 - yl} phosphite; and
Tris{2 - [bis(4 - bromophenyl)phosphinyloxy] - 1 - dodecyltetradecen - 1 - yl} phosphite.

When the adduct used is one derived from an α-ketoaldehyde compound or an unsymmetrical diketone, as above, the product obtained with phosphorus trichloride or phosphorus tribromide will be an isomeric mixture of two products wherein the Z and Z′ radicals are transposed. For example, when phenylglyoxaldehyde is used with triethyl phosphite to prepare the adduct starting material, the product with phosphorus trichloride is a mixture of tris[2 - (diethoxyphosphinyloxy) - 1 - phenylethenyl] phosphite and its isomer tris[2 - (diethoxyphosphinyloxy) - 2 - phenylethenyl] phosphite. When the adduct is derived from an unsymmetrical diketone compound, such as, 2,3 - octanedione and a phosphonite ester, say, bis(2 - chloropropyl)phenylphosphonite, the product obtained with phosphorus tribromide is an isomeric mixture of tris{2 - [(2 - chloropropoxy)phenylphosphinyloxy] - 1 - methylhepten - 1 - yl} phosphite and its isomer tris{2 - [(2 - chloropropoxy)phenylphosphinyloxy] - 1 - pentylpropen - 1 - yl} phosphite. Other examples of products of these types are:

Tris[2 - (diphenoxyphosphinyloxy) - 1 - cyclohexylethenyl] phosphite, and its isomer tris[2 - (diphenoxyphosphinyloxy) - 2 - cyclohexylethenyl] phosphite;

Tris{2 - [(2 - chlorobutoxy)hexylphosphinyloxy] - 1 - methylethenyl} phosphite and its isomer tris{2-[(2-chlorobutoxy)hexylphosphinyloxy]propen-1-yl} phosphite;

Tris{2 - [bis(p - tolyl)phosphinyloxy] - 1 - (p-methylphenyl)-ethenyl} phosphite and its isomer tris{2-[bis-(p - tolyl)phosphinyloxy] - 2 - (p - methylphenyl)-ethenyl} phosphite;

Tris{2 - [phenyl(2 - chloroethoxy)phosphinyloxy] - 1 - octyl-penten-1-yl} phosphite and its isomer tris{2-[phenyl(2-chloroethoxy)phosphinyloxy]-1-propyldecen-1-yl} phosphite; and Tris{2 - [bis(2 - chloropropyl)phosphinyloxy] - 1 - (2,4-dimethylphenyl(propen-1-yl)} phosphite and its isomer tris{2-[bis(2 - chloropropyl)phosphinyloxy] - 1 - methyl-2-(2,4-dimethylphenyl)ethenyl} phosphite.

Reaction of the trivalent phosphorus chloride or bromide compound and the adduct starting materials takes place by mixing together the reactants in the above indicated proportions at ordinary, decreased, or increased temperature, and allowing the resulting reaction mixture to stand until formation of the (phosphinyloxy)alkenyl phosphite, phosphonite, or phosphinite compound is complete. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants increases. Also when the adduct is one derived from a higher α-alkanedione or higher aryldione, reaction is generally not as rapid as it is with lower α-alkanediones or with benzil. It is thus recommended that with each initial run the reactants be mixed gradually at low temperature and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or by the quantity of alkyl or haloalkyl chloride or bromide produced. When using an adduct derived from the low α-alkanediones, external cooling is usually advantageous. When working with such diketone compounds, optimum conditions comprise gradual addition of the trivalent phosphorus halide reactant to the addut with application of external cooling and thorough stirring. Usually, it suffices to maintain the reaction temperature at, say, from 25° C. to 50° C. during addition of the trivalent phosphorus chloride or bromide reactant. When all of the halide reactant has been added, and there is no longer any evidence of exothermic reaction, completion of the reaction may be assured by heating the reaction mixture to a temperature of from, say, 75° C. to 150° C. for a period of about one-half to two hours.

While it is desirable to first form the adduct by reacting the dicarbonyl compound and the trivalent phosphorus ester prior to the reaction thereof with the trivalent phosphorus halide reactant, the three materials, i.e., the dicarbonyl compound, the trivalent phosphorus ester, and the trivalent phosphorus halide, may be added to the reaction vessel in any order, i.e., simultaneously, or one after the other, except that the dicarbonyl compound should not be contacted with the trivalent phosphorus halide in the absence of the trivalent phosphorus ester. When these three materials are contacted, the ensuing reaction results in the formation of the adduct which in turn reacts with the trivalent phosphorus halide reactant.

Stoichiometric proportions are advantageously employed in that thereby good yields of desired products result and there arises substantially no problem of separating any excess reactant. However, excess amounts of the halide or adduct reactants may be employed. In such cases, the excess reactant would have to be removed if a pure product were desired. Although optimum procedure calls for adding the halide reactant to the adduct, the two reactants may be added simultaneously to the reaction vessel, or the adduct may be added to the halide reactant.

Formation of the desired product, i.e., a (phosphinyloxy)alkenyl derivative of a trivalent phosphorus compound, is accompanied by the formation of a halogenated alkane as a by-product. For example,

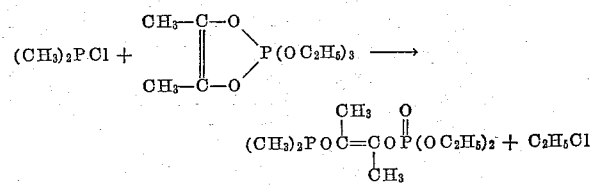

The by-product halogenated alkanes, in this case, ethyl chloride, are generally articles of commerce for which many applications exist. Thus, while many currently employed processes for the manufacture of organic compounds of phosphorus entail substantial waste of halogen in that by-products of little commercial importance are formed, in the present process all of the halogen constituent of the raw materials is converted to products of economic importance.

The process of the present invention is readily conducted in the absence of an inert diluent or catalyst. However, catalysts and diluents or solvents may be employed. The use of diluents may be particularly advantageous when working with the lower molecular weight reactants. Such diluents may be, e.g., benzene, toluene, dioxane, methylene chloride, methylene bromide, or hexane. When employing no diluent and using substantially the stoichiometric proportion of reactants, the reaction product which consists essentially of the (phosphinyloxy)alkenyl derivative of the trivalent phosphorus compound dissolved in the halogenated alkane which is produced as a by-product in the reaction may be used directly for a variety of industrial and agricultural purposes without purification.

The compounds provided by this invention are stable, usually high boiling materials which range from viscid liquids to waxy or crystalline solids. They are useful as biological toxicants, e.g., insecticides, fungicides, nematocides, bacteriostats; as lubricant and gasoline additives; as functional fluids, e.g., in force transmission media and in dielectric applications; as plasticizers for synthetic resins and plastics, and as rubber compounding chemicals. They are also useful as antioxidants and as pharmaceuticals. The compounds of this invention, especially those which contain bromine and/or chlorine, are particularly useful as fire retardant or flame-proofing chemicals. They are especially valuble in organic compositions. They are valuable as additives to polyurethane and polystyrene foams, to other synthetic polymer compositions, as well as cellulosic and carbonaceous combustible materials, e.g., surface coatings, lacquers, polymers, resins, adhesives, and sealing compositions.

The examples given below were conducted in reaction

Example 1 flasks equipped with stirrer, thermometer, dropping funnel, condenser, and attached to apparatus providing cooling means, nitrogen atmosphere, and reduced pressures when such aids were desired. The indicated yields express percent conversion to the desired product.

Example 1

To a reaction vessel containing 62.8 g. (0.249 mole) of 2 - chloro - 5,5 - dimethyl - 1,3,2-dioxaphosphorinane was added 41.9 g. (0.249 mole) of a 1:1 adduct of 2,3-butanedione and triethyl phosphite in ten minutes. When the addition was completed, the mixture was stirred for ten minutes, and then heated to 130° C. and kept at 125–135° C. for one hour. Distillation gave 69.6 g. (81% yield) of 2 - [2 - (diethoxyphosphinyloxy) - 1-methylpropen-1-yloxy]-5,5-dimethyl-1,3,2-dioxaphosphorinane,

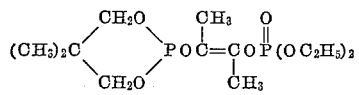

B.P. 137–139° C./0.2 mm., and analyzing as follows:

|  | Found | Anal. Calc'd for $C_{13}H_{26}O_7P_2$ |
|---|---|---|
| Percent C | 43.76 | 43.88 |
| Percent H | 7.31 | 7.36 |
| Percent P | 17.58 | 17.39 |

Nuclear magnetic resonance and infrared spectra were also consistent with the structure. Further proof of structure is provided in the next example.

Example 2

To aid in demonstrating the structure of compounds of this invention, the product of Example 1 was hydrolyzed. It would be expected to hydrolyze according to the following equation:

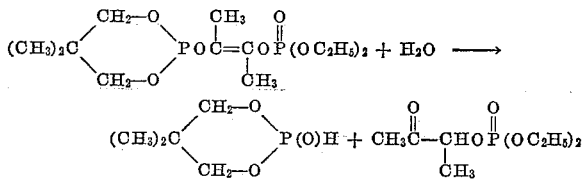

To a reaction vessel containing 62.6 g. (0.176 mole) of the product of Example 1 there was added dropwise in a few minutes 4.0 g. (0.176 mole plus 25% excess) of distilled water. By the end of the addition and exothermic reaction was noticeable. The mixture was stirred and cooled occasionally to keep the temperature below 40° C. When no further reaction was apparent, the mixture was warmed to 55° C. and distilled to give (1) 29.0 g. (74.5% yield) of the expected 2-oxo-2-hydro-5,5-dimethyl-1,3,2-dioxaphosphorinane, B.P. 97–104° C./0.06–0.1 mm., $n_D^{25}$ 1.4230, and (2) 14.1 g. (54% yield) of the expected 1-methyl-2-oxopropyl diethyl phosphate. Both products 1 and 2 were identical to authentic samples prepared by alternate syntheses. They analyzed as follows:

| Fraction (2) | Found | Anal. Calc'd for $C_8H_{17}O_5P$ |
|---|---|---|
| Percent C | 42.73 | 42.88 |
| Percent H | 7.49 | 7.63 |
| Percent P | 14.01 | 13.81 |

| Fraction (1) | Found | Anal. Calc'd for $C_5H_{11}O_3P$ |
|---|---|---|
| Percent C | 40.24 | 39.99 |
| Percent H | 7.50 | 7.38 |
| Percent P | 20.38 | 20.62 |

Example 3

To a flask containing 59.4 g. (0.3 mole) of diethyl phenylphosphonite there was added 25.8 g. (0.3 mole) of redistilled 2,3-butanedione dropwise in 10 minutes at 25–35° C. using ice bath cooling. The mixture was heated to 60° C. to insure complete reaction. To the thus obtained adduct there was added 50.5 g. (0.3 mole) of 5,5-dimethyl-2-chloro-1,3,2-dioxaphosphorinane dropwise over 0.2 hour. The mixture was heated to 140° C. and then at 120–135° C. for 1.5 hours. Ethyl chloride by-product was removed under water pump vacuum and then the residue was distilled to give 96.5 g. (83% yield) of 2-[2-(ethoxyphenylphosphinyloxy)-1-methyl-propen-1-yloxy]-5,5 - dimethyl - 1,3,2-dioxaphosphorinane, B.P. 174–175° C./0.2 mm., having the structure,

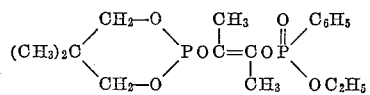

which anaylzed as follows:

|  | Found | Calc'd for $C_{17}H_{26}O_6P_2$ |
|---|---|---|
| Percent C | 52.41 | 52.59 |
| Percent H | 6.72 | 6.71 |
| Percent P | 15.89 | 15.93 |

Example 4

To a flask containing 35.9 g. (0.122 mole) of an adduct of 2,3-butanedione and triisopropyl phosphite there was added 10.9 g. (0.061 mole) of phenylphosphonodichloridite in 3 minutes. During the addition the temperature of the mixture rose from 22° C. to 35° C. and continued to a maximum of 44° C. before subsiding. The mixture was heated to 80° C. to insure complete reaction and then heated under vacuum to remove isopropyl chloride by-product. The residue was concentrated to 75° C./0.4 mm. to obtain 38.5 g. of substantially pure bis[2-(6-diisopropoxyphosphinyloxy)-1-methyl-propen-1-yl] phenylphosphonite which analyzed as follows:

|  | Found | Calc'd for $C_{26}H_{44}O_{10}P_3$ |
|---|---|---|
| Percent C | 50.88 | 51.11 |
| Percent H | 7.71 | 7.41 |
| Percent P | 14.91 | 15.20 |

Operating as above, but using phosphorus trichloride rather than phenylphosphonodichloridite, and 0.183 mole of the adduct, tris[2 - (diisopropoxyphosphinyloxy) - 1-methylpropen-1-yl] phosphite is obtained.

Example 5

To a reaction flask swept with nitrogen there was added 55.4 g. (0.33 mole) of triethyl phosphite, and then 28.7 g. (0.33 mole) of 2,3-butanedione was added in ten minutes at 25–35° C. When the addition was completed, the mixture was stirred until no further reaction was apparent and then heated to 60° C. to insure complete reaction.

After cooling the above prepared adduct, there was added 58.2 g. (0.33 mole) of 2-chloro-4,5-benzo-1,3,2-dioxaphospholane in ten minutes at 30–40° C. The mixture was warmed to 100° C. to insure complete reaction and then distilled to give 105 g. (87% yield) of 2-[2-(diethoxyphosphinyloxy)-1-methylpropen-1 - yloxy] - 4,5-benzo - 1,3,2 - dioxaphospholane, B.P. 155–160° C./0.4 mm., having the structure,

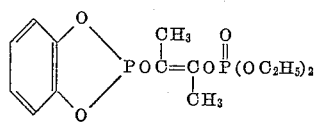

which analyzed as follows:

|  | Found | Anal. Calc'd for $C_{14}H_{20}O_7P_2$ |
|---|---|---|
| Percent C | 46.60 | 46.44 |
| Percent H | 5.74 | 5.56 |
| Percent P | 17.02 | 17.10 |

*Example 6*

To 47.0 g. (0.186 mole) of an adduct of 2,3-butanedione and triethyl phosphite there was added dropwise in 5 minutes 28.8 g. (0.186 mole) of 2-chloro-4-methyl-1,3,2-dioxaphosphorinane with a 2° C. rise being noted. The mixture was stirred for 10 minutes and then heated to 140° C. After cooling, the mixture was warmed to 100° C. under vacuum to remove by-product ethyl chloride. Distillation of the residue gave 47.7 g. (83% yield) of 2-[2-(diethoxyphosphinyloxy)-1-methylpropen-1-yloxy]-4-methyl-1,3,2 - dioxaphosphorinane, B.P. 144° C./0.01 mm., which analyzed as follows:

|  | Found | Calc'd for $C_{12}H_{24}O_7P_2$ |
|---|---|---|
| Percent C | 41.84 | 42.08 |
| Percent H | 7.18 | 7.07 |
| Percent P | 18.23 | 18.11 |

*Example 7*

To 41.5 g. (0.164 mole) of an adduct of 2,3-butanedione and triethyl phosphite there was added 25.7 g. (0.164 mole) of redistilled diethyl phosphorochloridite in 0.1 hour with the temperature rising from 23° C. to 26° C. during the addition and to a maximum of 28° C. before subsiding. The mixture was heated at 125–135° C. for 25 minutes. On cooling, distillation gave 31.1 g. of 2-(diethoxyphosphinyloxy)-1-methylpropen-1-yl diethyl phosphite, B.P. 118° C./0.1 mm. $n_D^{25}$ 1.4411, which analyzed as follows:

|  | Found | Calc'd for $C_{12}H_{26}O_7P_2$ |
|---|---|---|
| Percent C | 42.06 | 41.91 |
| Percent H | 7.76 | 7.61 |

*Example 8*

To a reaction flask containing 412.1 g. (3.0 moles) of phosphorus trichloride and 4 g. of ethylene chlorohydrin, as catalyst, there was added 435.6 g. (7.5 moles) of propylene oxide dropwise in 0.5 hour at 10–15° C. When the addition was completed, the mixture was stirred at room temperature for one hour. To this mixture there was added dropwise in 0.3 hour 129.2 g. (1.5 moles) of 2,3-butanedione at 35–45° C. The mixture was stirred until no further exothermic reaction was observed and then was heated at 120–130° C. for 1 hour. The mixture was cooled and then concentrated to 130° C./0.08 mm. to remove by-product 1,2-dichloropropane. There was obtained as residue 799.4 g. (99% of theory) of 2-[bis (2-chloropropoxy)phosphinyloxy] - 1 - methylpropen-1-yl bis(2-chloropropyl) phosphite, which analyzed as follows:

|  | Found | Calc'd for $C_{16}H_{30}Cl_4O_7P_2$ |
|---|---|---|
| Percent C | 35.50 | 35.77 |
| Percent H | 5.89 | 5.63 |
| Percent P | 11.53 | 11.50 |
| Percent Cl | 26.52 | 26.34 |

*Example 9*

To a flask containing an adduct prepared by reacting 205.4 g. (0.66 mole) of tris(2-chloropropyl) phosphite and 56.9 g. (0.66 mole) of 2,3-butanedione at 45° C. until the apparent exothermic reaction was completed and then to 85° C. to insure complete reaction, there was added dropwise 83.5 g. (0.66 mole) of 2-chloro-1,3,2-dioxaphospholane. The mixture was heated to 90° C. at which temperature an exothermic reaction was apparent, then to 100–125° C. for one-half hour and finally concentrated to 130° C./1.0 mm., removing the by-product, and leaving as residue 268.5 g. of 2-{2-[bis(2-chloropropoxy) phosphinyloxy]-1-methylpropen-1 - yloxy}-1,3,2 - dioxaphospholane, having the structure,

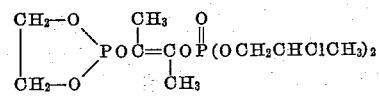

which analyzed as follows:

|  | Found | Calc'd for $C_{12}H_{22}Cl_2O_7P_2$ |
|---|---|---|
| Percent C | 34.99 | 35.09 |
| Percent H | 5.67 | 5.38 |
| Percent Cl | 17.46 | 17.23 |
| Percent P | 15.03 | 15.05 |

*Example 10*

To an adduct prepared by reacting 66.9 g. (0.2 mole) of trihexyl phosphite and 33.2 g. (0.2 mole) of 2,3-octanedione at 30–40° C. while cooling when necessary, and then warming to 90° C. to insure complete reaction, there was added dropwise in 0.1 hour at room temperature 35.8 g. (0.2 mole) of 5,5-dimethyl-2-chloro-1,3,2-dioxaphosphorinane. After stirring for 10 minutes, the mixture was then concentrated to 120° C./0.25 mm. to remove by-product; there was thus obtained as residue 102.4 g. (98% yield) of 2-[2-(dihexyloxyphosphinyloxy)-1-methylhepten-1-yloxy]-5,5-dimethyl - 1,3,2 - dioxaphosphorinane and its isomer. The mixture analyzed as follows:

|  | Found | Calc'd for $C_{25}H_{52}O_7P_2$ |
|---|---|---|
| Percent C | 57.19 | 57.24 |
| Percent H | 9.64 | 9.60 |
| Percent P | 11.58 | 11.81 |

*Example 11*

To a flask flamed dry in nitrogen there was added 70.1 g. (0.33 mole) of benzil in 75 ml. of methylene chloride. Then 41.1 g. (0.33 mole) of trimethyl phosphite was added dropwise in 0.15 hour at 25–40° C. while cooling when necessary. The mixture was stirred until no further exothermic reaction was apparent and then heated to reflux (53° C.) for 0.33 hour to insure complete reaction.

To the above prepared adduct solution there was added 56.2 g. (0.33 mole) of 5,5-dimethyl-2-chloro-1,3,2-dioxaphosphorinane. The mixture was heated to 110–120° C. for 1.4 hours and cooled under vacuum to remove the by-product. The residue was concentrated to 125° C./1.0 mm. On cooling, the residue solidified at about 70° C. The residue was recrystallized from hexane-benzene to give a substantially quantitative yield of 2-[2-(dimethoxyphosphinyloxy)-1,2-diphenylethenyloxy]-5,5 - dimethyl-1,3,2-dioxaphosphorinane, which analyzed as follows:

|  | Found | Calc'd for $C_{21}H_{26}O_7P_2$ |
|---|---|---|
| Percent C | 55.81 | 55.75 |
| Percent H | 5.92 | 5.80 |
| Percent P | 13.49 | 13.70 |

Example 12

To a flask containing 93.6 g. (0.74 mole) of 2-chloro-1,3,2-dioxaphospholane and 123 g. (0.74 mole) of triethyl phosphite, cooled to 22° C., there was added 32.0 g. (0.37 mole) of 2,3-butanedione. The temperature of the mixture was kept at 17–25° C. during the addition. When the exothermic reaction was complete, the mixture was heated at 80° C. for two hours, cooled to 35° C., and heated to 60° C. under vacuum to remove volatile by-products and impurities. The residue was distilled to give as the main product, 90.6 g. (78% yield) of 2-[2-(diethoxyphosphinyloxy)-1-methylpropen-1-yloxy] - 1,3,2-dioxaphospholane, B.P. 143–146° C./0.2 mm., $n_D^{25}$ 1.4618.

|  | Found | Calc'd for $C_{10}H_{20}O_7P_2$ |
|---|---|---|
| Percent C | 38.43 | 38.21 |
| Percent H | 6.57 | 6.39 |
| Percent P | 19.82 | 19.71 |

Example 13

The product of Example 12, that is, 2-[2-(diethoxyphosphinyloxy)-1-methylpropen-1-yloxy] - 1,3,2 - dioxaphospholane, was also made as follows:

To a flask containing 84.1 g. of a 1:1 adduct of triethyl phosphite and 2,3-butanedione there was added dropwise in 15 minutes 43.3 g. (0.33 mole) of 2-chloro-1,3,2-dioxaphospholane while controlling the temperature between 23° C. and 42° C. When the exothermic reaction was complete, the mixture was heated to 110° C. in 0.75 hour to insure complete reaction. After removing by-product, ethyl chloride, there was obtained 93.2 g. of a colorless liquid having an index of refraction of 1.4618, the same as that of Example 12.

Example 14

To 126.1 g. (0.5 mole) of a 1:1 adduct of triethyl phosphite and 2,3-butanedione there was added 22.9 g. (0.167 mole) of phosphorus trichloride while controlling the temperature below 30° C. When the addition was completed, the mixture was heated at 110–120° C. for 0.5 hour while ethyl chloride by-product was removed. The residue was concentrated at reduced pressure to give a mixture containing tris[2-(diethoxyphosphinyloxy)-1-methylpropen-1-yl] phosphite and bis[2-(diethoxyphosphinyloxy)-1-methylpropen-1-yl] phosphorochloridite.

Example 15

To a flask containing 14.8 g. (0.0553 mole) of a 1:1 adduct of triethyl phosphite and 2,3-pentanedione there was added dropwise 4.4 g. of butylphosphonodichloridite while controlling the temperature below 30° C. during the addition. The mixture was then heated to 90° C. to insure complete reaction. The mixture was concentrated to remove by-product and any volatale impurities to 61–70° C./0.2–0.6 mm. There was obtained as residue 12.4 g. of substantially pure bis[2-(diethoxyphosphinyloxy)-1-methylbuten-1-yl] butylphosphonite (and isomer).

Example 16

To a reaction vessel containing 48.5 g. (0.192 mole) of a 1:1 adduct of triethyl phosphite and 2,3-butanedione there was added dropwise in five minutes 13.2 g. (0.091 mole) of ethyl phosphorodichloridite while keeping the temperature below 40° C. When no further reaction was evident the mixture was heated to 60° C. to insure complete reaction and then subjected to vacuum to remove the by-product. The residue was concentrated to 104° C./2.0 mm. Nuclear Magnetic Resonance spectra and infrared analysis showed that the product was bis[2-(diethoxyphosphinyloxy) - 1-methylpropen-1-yl] ethyl phosphite.

Example 17

To 26.4 g. (0.09 mole) of an adduct of 2,3-butanedione and triisopropyl phosphite there was added 15.1 g. of diisopropyl phosphorochloridite. The mixture was heated at 120–130° C. for 1.25 hours. After cooling to 75° C., the by-product isopropyl chloride was removed under vacuum and the residue was distilled to give 18.6 g. of 2-(diisopropoxyphosphinyloxy)-1-methylpropen-1-yl diisopropyl phosphite, B.P. 120–122° C./0.15 mm.

Example 18

To 31.8 g. (0.15 mole) of a 1:1 molar adduct of 2,3-butanedione and trimethyl phosphite there was added 33.1 g. (0.15 mole) diphenylchlorophosphine dropwise over 5 minutes. The mixture was heated gradually to 103° C. over 15 minutes and then subjected to vacuum pressure to remove by-product methyl chloride. The product was concentrated to 90° C./1.5 mm. Nuclear Magnetic Resonance and infrared analysis procedures showed the product to be 2-(dimethoxy-phosphinyloxy)-1-methylpropen-1-yl diphenylphosphinite.

Example 19

To 99.1 f. (0.3 mole) of an adduct of 2,3-butanedione and triisopropyl phosphite there was added 24.2 g. (0.3 mole) of isopropyl phosphorodichloridite in 5 minutes. Cooling was necessary to keep the temperature below 50° C. When the exothermic reaction had subsided, the mixture was heated to 135° C. while distilling out by-product. The mixture was heated at 125° C. for 0.67 hour. Concentrating the residue to 190° C./1.25 mm. gave 80 g. (90% of theory) of bis[2-(diisopropoxyphosphinyloxy) - 1 - methylpropen-1-yl] isopropyl phosphite which analyzed as follows:

|  | Found | Calc'd for $C_{23}H_{49}O_9P_3$ |
|---|---|---|
| Percent C | 45.45 | 46.62 |
| Percent H | 7.79 | 7.94 |
| Percent P | 15.15 | 15.64 |

We claim:

1. Compounds of the formula

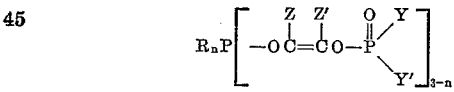

wherein R is selected from the group consisting of hydrocarbyl, hydrocarbyloxy, hydrocarbylthio, halohydrocarbyl, halohydrocarbyloxy and halohydrocarbylthio radicals which are free from aliphatic unsaturation and have from 1 to 12 carbon atoms, and wherein two R radicals taken together denote a bivalent radical selected from the group consisting of —O—alkylene—O— having from 2 to 12 carbon atoms and —O—arylene—O— having from 6 to 12 carbon atoms and which complete with the phosphorus atom a ring having from 2 to 4 carbon atoms; n is a whole number of from 0 to 2; Z is selected from a group consisting of alkyl radicals having from 1 to 12 carbon atoms, and aryl radicals having from 6 to 12 carbon atoms; Z' is selected from the group consisting of Z and hydrogen; Y and Y' are each selected from the group consisting of alkoxy and haloalkoxy radicals of from 1 to 12 carbon atoms and aryl radicals having from 6 to 12 carbon atoms.

2. Compounds according to claim 1, wherein n is 2.
3. Compounds according to claim 1, wherein n is 1.
4. Compounds according to claim 1, wherein n is 0.
5. Compounds according to the formula of claim 1 wherein n is 2, each R radical is a haloalkoxy radical of from 1 to 12 carbon atoms.
6. Compounds according to claim 1 wherein n is 2, and two R radicals are taken together to denote a bivalent radical selected from the group consisting of —O—alkylene—O— having from 2 to 12 carbon atoms and —O—arylene—O— having from 6 to 12 carbon atoms and forming with the trivalent phosphorus atom a ring having from 2 to 4 carbon atoms.

7. 2 - [2 - (ethoxyphenylphosphinyloxy)-1-methylpropen-1-yl]-5,5-dimethyl-1,3,2-dioxaphosphorinane.

8. 2 - (dimethoxyphosphinyloxy) - 1-methylpropen-1-yl diphenylphosphinite.

9. 2 - [bis(2-chloropropoxy)phosphinyloxy]1-methylpropen-1-yl bis(2-chloropropyl) phosphite.

10. 2 - [2-(dimethoxyphosphinyloxy)1,2-diphenylethenyloxy]-5,5-dimethyl-1,3,2-dioxaphosphorinane.

11. 2 - [2-dihexyloxyphosphinyloxy)-1-methylhepten-1-yloxy]-5,5-dimethyl-1,3,2-dioxaphosphorinane.

12. A method which comprises reacting a 1:1 adduct of a trivalent phosphorus acid ester of the formula

wherein R is selected from the group consisting of alkoxy and haloalkoxy radicals having from 2 to 12 carbon atoms, Y is selected from the group consisting of hydrocarbyl, hydrocarbyloxy, halohydrocarbyl, and halohydrocarbyloxy radicals which are free from aliphatic unsaturation and have from 1 to 12 carbon atoms, Y' is selected from the group consisting of Y, hydrocarbylthio, and halohydrocarbylthio radicals which are free from aliphatic unsaturation and have from 1 to 12 carbon atoms; and an α-dicarbonyl compound of the formula

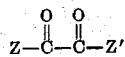

wherein Z is selected from the group consisting of hydrocarbyl radicals which are free from aliphatic unsaturation and have from 1 to 12 carbon atoms, and Z' is selected from the group consisting of Z and hydrogen, with a trivalent phosphorus halogen compound of the formula

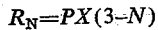

$R_N=PX(3-N)$ wherein R is selected from the group consisting of hydrocarbyl, hydrocarbyloxy, hydrocarbylthio, halohydrocarbyl and halohydrocarbyloxy and halohydrocarbylthio radicals which are free from aliphatic unsaturation and have from 1 to 12 carbon atoms, and wherein two R radicals taken together denote a bivalent radical selected from the group consisting of —O—alkylene—O— having from 2 to 12 carbon atoms and —O—arylene—O— having from 6 to 12 carbon atoms; X is selected from the group consisting of bromine and chlorine; and $n$ is a whole number of from 0 to 2.

13. A method according to claim 12 wherein the 1:1 adduct of a trivalent phosphorus acid ester and an α-dicarbonyl compound as defined therein is prepared in situ by reacting the trivalent phosphorus acid ester and the α-dicarbonyl compound in the presence of the trivalent phosphorus halogen compound reactant.

14. A method according to claim 12, wherein the trivalent phosphorus halide compound reactant is one wherein $n$ is 2, and two R radicals taken together denote a bivalent radical selected from the group consisting of —O—alkylene—O— having from 2 to 12 carbon atoms and —O—arylene—O— having from 6 to 12 carbon atoms and completing with the phosphorus atom a ring having from 2 to 4 carbon atoms.

15. A method which comprises reacting 2-chloro-5,5-dimethyl-1,3,2-dioxaphosphorinane with a 1:1 adduct of diethyl phenylphosphonite and 2,3-butanedione and recovering 2 - [2-(ethoxyphenylphosphinyloxy)-1-methylpropen-1-yloxy]-5,5-dimethyl-1,3,2-dioxyphosphorinane.

16. A method which comprises reacting phenylphosphonodichloridite with a 1:1 adduct of triisopropyl phosphite and 2,3-butanedione and recovering bis[2-(diisopropoxyphosphinyloxy) - 1-methylpropen-1-yl] phenylphosphonite.

17. A method which comprises reacting 2-chloro-5,5-dimethyl-1,3,2-dioxaphosphorinane with 1:1 adduct of trimethyl phosphite and benzil, and recovering 2-[2-(dimethoxyphosphinyloxy) - 1,2-diphenylethenoloxy]-5,5-dimethyl-1,3,2-dioxaphosphorinane.

No references cited.